United States Patent [19]

Sung

[11] Patent Number: 5,759,124
[45] Date of Patent: Jun. 2, 1998

[54] MULTISTAGE SPROCKET USED IN A BICYCLE REAR DERAILLEUR SYSTEM

[75] Inventor: Cheng-kuo Sung, Hsinchu, Taiwan

[73] Assignee: National Science Council, Taipei, Taiwan

[21] Appl. No.: 544,584

[22] Filed: Oct. 18, 1995

[51] Int. Cl.⁶ ............... F16H 55/30; B62M 9/12
[52] U.S. Cl. ............ 474/78; 474/152; 474/158; 474/160
[58] Field of Search ............ 474/77, 78, 80, 474/152, 153, 158, 160; 280/260

[56] References Cited

U.S. PATENT DOCUMENTS

| | | | |
|---|---|---|---|
| 4,259,880 | 4/1981 | Ueno | 74/594 |
| 4,612,004 | 9/1986 | Nagano | 474/80 |
| 4,988,328 | 1/1991 | Iwasaki et al. | 474/160 |
| 5,133,695 | 7/1992 | Kobayashi | 474/160 |
| 5,188,569 | 2/1993 | Kobayashi | 474/160 |
| 5,192,250 | 3/1993 | Kobayashi | 474/162 |

*Primary Examiner*—Tamara L. Graysay
*Assistant Examiner*—Gary S. Hartmann
*Attorney, Agent, or Firm*—Beveridge, DeGrandi, Weilacher & Young, LLP.

[57] ABSTRACT

A multistage sprocket assembly for a bicycle with at least one large sprocket and one small sprocket disposed adjacent to each other and assembled in a relationship such that the distance between the escape point between a pair of adjacent teeth at the large sprocket and the engagement point between a pair of adjacent teeth at the small sprocket is small than an integer multiple of the chain pitch. A recess portion is formed at the side surface of the large sprocket facing the small sprocket to prevent interference between the side link plate of the chain with the side surface of the large sprocket when the chain is being shifted from the large sprocket to the small sprocket. The chain between the aforesaid escape point and engagement point is also supported by the recess portion and forms a nonlinear upshifting path as seen from an axial direction from the small sprocket to the large sprocket.

11 Claims, 23 Drawing Sheets

Modified Non-upshifting Tooth

Modified Upshifting Tooth

Rotational Direction of Freewheel

MULTISTAGE SPROCKET USED IN A BICYCLE REAR DERAILLEUR SYSTEM

DETAILED DESCRIPTION

1. Field of the Invention

The present invention related to a sprocket assembly used in a multistaged speed-changeable bicycle having at least one L and one S sprocket which are designed and manufactured with the aid of a computer, as a result, the chain can be shifted smoothly from L sprocket to S sprocket during upshifting process.

2. Prior Art

Generally, the shifting motion of bicycle speed-changer can be divided into upshifting and downshifting and the design of most multistage sprocket assemblies for known bicycles were all focused on its downshifting motion and its upshifting motion was often neglected.

Traditionally, no special design has ever been made on a bicycle sprocket assembly directed to its upshifting motion during shifting process and shifting motion occurred when the rider shifts up the shift lever. At this moment, the chain follows the action of guide pulley to bias and strides over the tooth portion of L sprocket. It is at this point the side plate of chain pitch tends to stride on the tip of tooth. As the sprocket assembly continues to rotate, the chain biases out from the teeth portion of L sprocket. Since no design has ever specified the particular path and phase relationship between L and S sprockets, the rollers of the chain shall not immediately enter into the slots of two adjacent teeth of S sprocket. Instead of, a certain length of chain shall stride on the tips of teeth of S sprocket (see FIG. 1) and its rollers are not yet fitted into the slots. During the shifting process, the said length of chain pitches are most possible to fall into the slots in a sudden moment. At this instance, the chain shall be suddenly released from the sprocket assembly. In order to maintain a constant tension, the cage of the derailleur shall rotate reversibly to absorb those chain pitches suddenly released. On the other hand, due to the sudden dropping of the chain pitches, the reaction force applied to the pedal in response to the rider's foot driving shall be suddenly reduced and the rider will feel a "run-free". This is what is called "unsmoothness" on upshifting.

Recently, ROC Pat. No. 197683 proposed a modification, on the profile of 2 to 3 teeth of L sprocket which enable the chain to be more easily from L sprocket toward S sprocket and the support means was also provided on the side portion of the sprocket for picking up the chain pitches. Then, the chain is brought to a proper position on the S sprocket by a guide pulley (the linear distance to the roller of raised chain pitches is np—α), and the rotation of sprocket assembly will move the chain to complete the upshifting motion.

Although, the above proposal has made the chain more easily to be disengaged from L sprocket and also arranged the chain path for upshifting process, the modification on teeth of non-upshifting position of L sprocket was not considered, and the unexpected unsmooth phenomenon still remains. Furthermore, the above design raised up few chain pitches while leaving L sprocket in order to obtain np—α linear distance from the rollers of chain pitches leaving L sprocket to the rollers of chain pitches arrived at S sprocket. In the initial stage of upshifting, those few raised chain pitches properly located positions for upshifting chain pitches, but at the time of completing the upshifting process, those raised chain pitches will suddenly fall into S sprocket and give an impact to S sprocket.

SUMMARY OF THE INVENTION

In view of the above, the main object of this invention is to avoid those unexpected unsmooth phenomenon during upshifting process by having a modification on tip ends of teeth which are respectively specified as upshifting and non-upshifting positions on the L sprocket.

The other objects of this invention are to arrange proper changer's path for the chain to be engaged with the teeth of S sprocket, and to arrange the phase angle between L and S sprockets and to remove the interference portion between the chain and both L and S sprockets.

When the chain is pulled from L sprocket to S sprocket by guide pulley, the chain shall not be able to move out from L sprocket while it is in a non-upshifting position. On the other hand, the chain shall be able to move out from L sprocket immediately upon its arrival at the upshifting position. Following the rotation of the sprocket assembly, the chain pitches sequentially abut on the designated upshifting path and engage with the proper teeth of S sprocket. Finally, the chain shall be gradually disengaged with L sprocket to complete a smooth upshifting process.

The further object of this invention is to design the modified teeth on L sprocket by a theoretical calculation with the aids of computer so that every movement during upshifting process shall be well under control.

BRIEF DESCRIPTION OF THE DRAWINGS

The above objects and advantages of the present invention will become more apparent by describing the attached drawings, in which.

DETAILED DESCRIPTION

Figure 1:
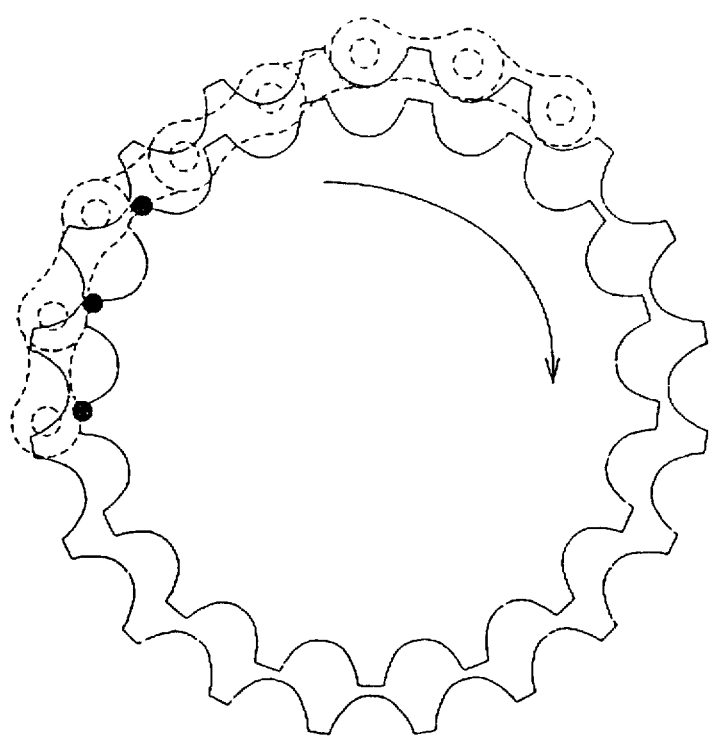
FIG. 1 is a diagram schematically illustrating the upshifting motion of the chain with L sprocket.
Figure 2:
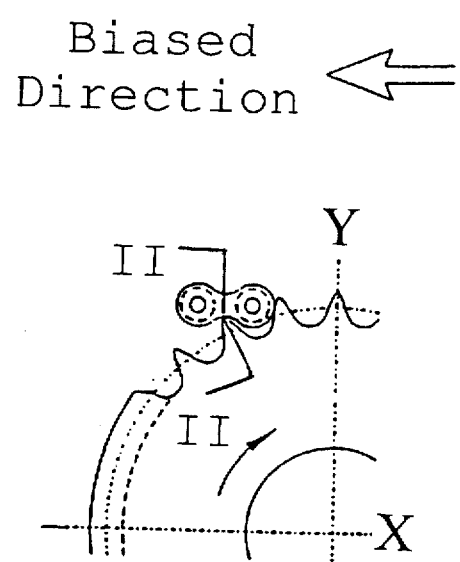
FIG. 2 is a partial diagram showing the cross-sectional line II—II location in relation to a tooth.
Figure 2A:
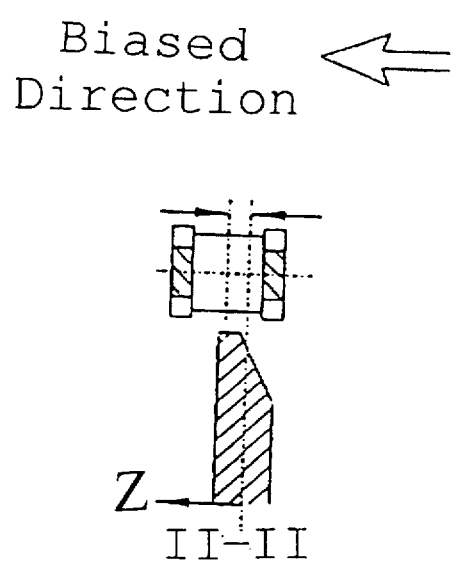
FIG. 2(a) is a diagram schematically showing the control of non-upshifting teeth at II—II.
Figure 2B:
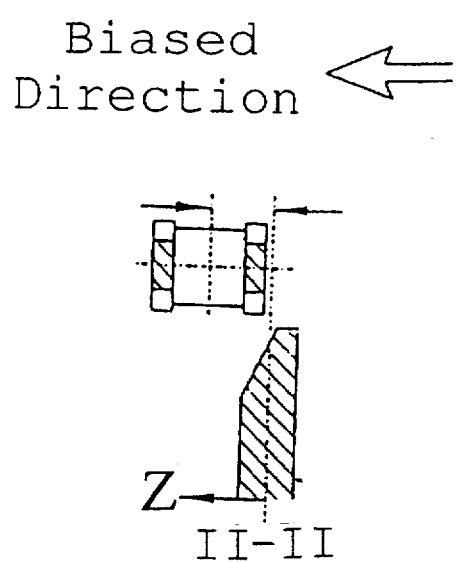
FIG. 2(b) is a diagram schematically showing the control of upshifting teeth at II—II.

To eliminate those unexpected phenomenon stated above, this invention, first, made certain modifications on the teeth of L sprocket according to the following steps: to fix both the upshifting point and the non-upshifting points on L sprocket; to give an accurate control on upshifting location on which the chain engaged onto L sprocket; based on the above points and location, to design the profile and arrangement of certain teeth on L sprocket. From other aspect of the invention, if non-upshifting point is fixed at the point where the chain tends to bias out from L sprocket and the side plates of chain pitch not to move out from the tip of the tooth, as tradition one does, this will delay the upshifting motion (see FIG. 2(a) until the chain arrives at the upshifting point, then, proceeds the upshifting motion.

Figure 3A:
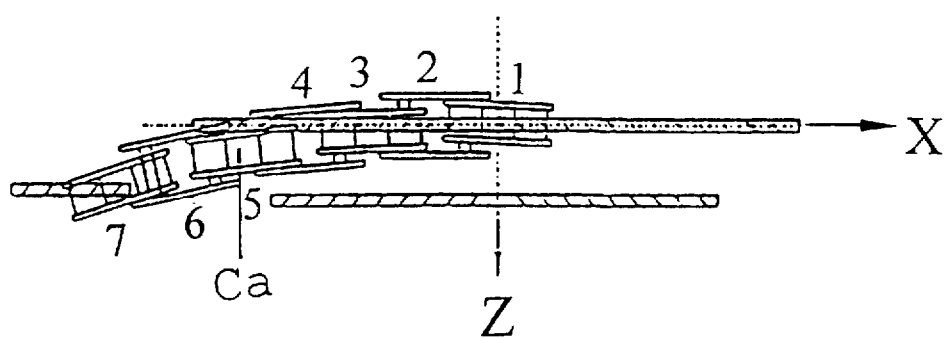
FIG. 3(a) is a top view schematically showing the critical chain pitch $C_a$ for controlling the modification on tip ends of upshifting teeth.
Figure 3B:
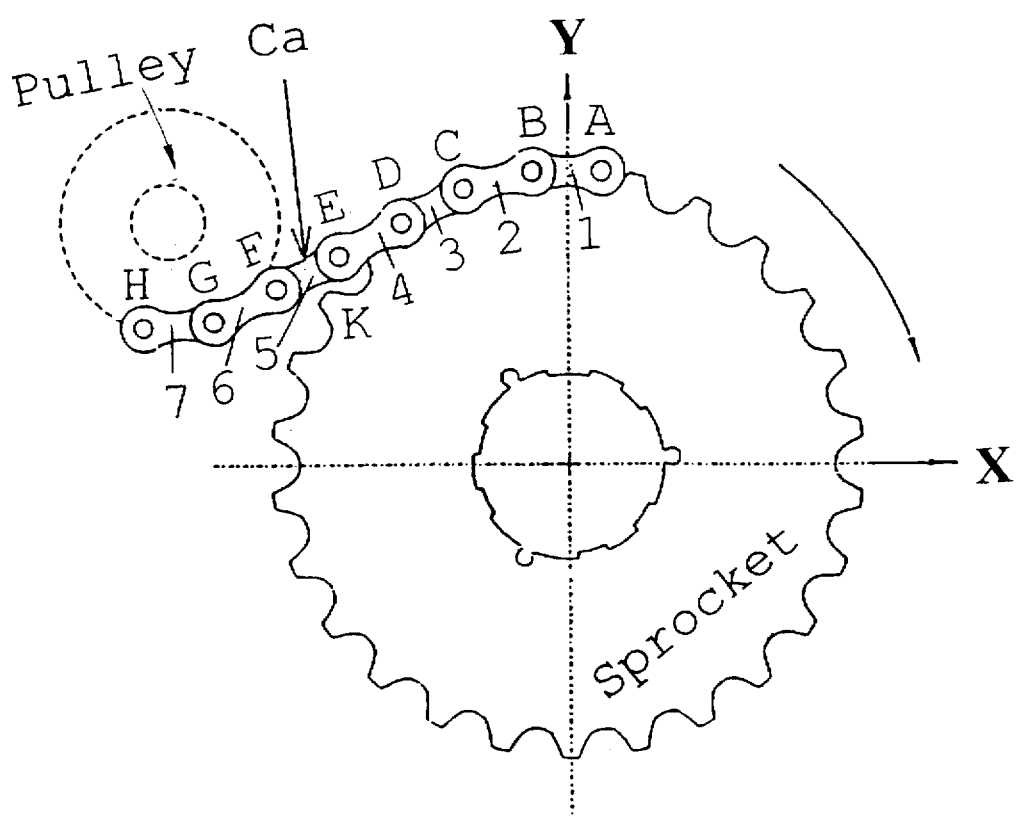
FIG. 3(b) is a side view of FIG. 3(a).

The point $C_a$ indicated in FIG. 3 is the critical chain position to be identified as the chain pitch which can be bias out from L sprocket while the chain is being pulled toward S sprocket by guide pulley.

Figure 4:
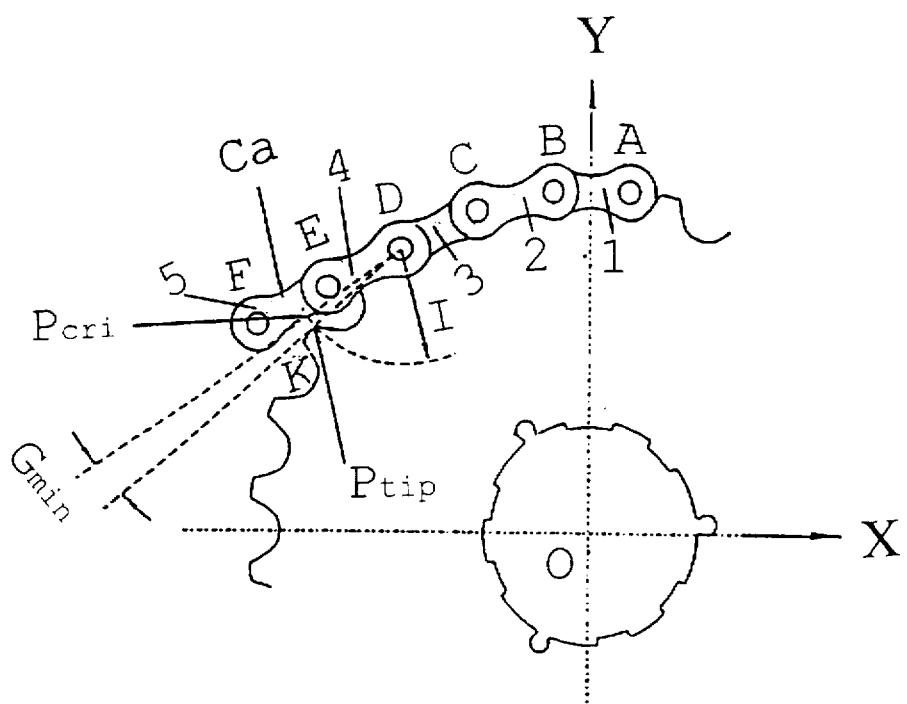
FIG. 4 is a scematic diagram showing an initial position of a chain pitch having biased laterally when upshifting motion occurred.

FIG. 4 illustrates the initial position of a chain pitch biased over L sprocket when the upshifting motion occurred.

Figure 5:
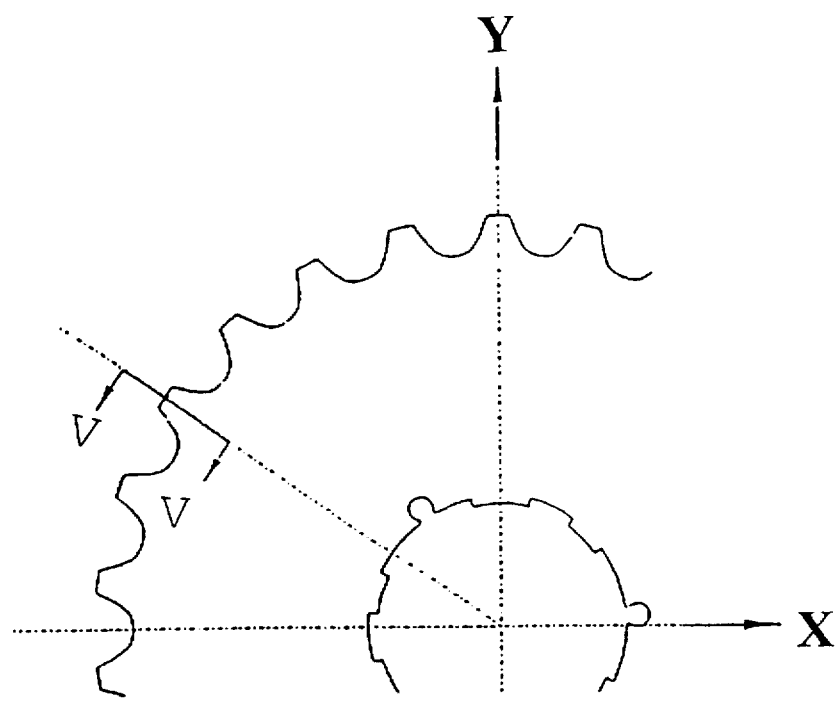
FIG. 5 is a partial diagram showing the location of cross-sectional line V—V in relation to a tooth.
Figure 5A:
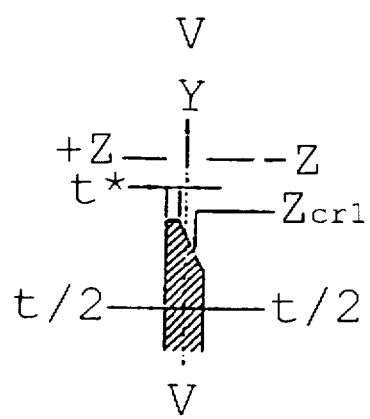
FIG. 5(a) is a scematic diagram showing the modified tip of a non-upshifting tooth at V—V.

To set the critical chain $C_a$ as a base, taking the position of chain pitch's side plate ($P_{cr1}$) displacing in the axial direction as indicated in $Z_{cr1}$ of FIG. 5(a) while the chain pitch $C_a$ is in contact with the point $P_{tip}$ into consideration, when the tooth top has a thickness of t* after having its tip modified, if $t/2-Z_{cr1} \geq t^*$, the chain pitch will be unable to bias out from L sprocket, this, will delay the upshifting. This point (tooth) is then referred as the non-upshifting point.

Figure 5B:
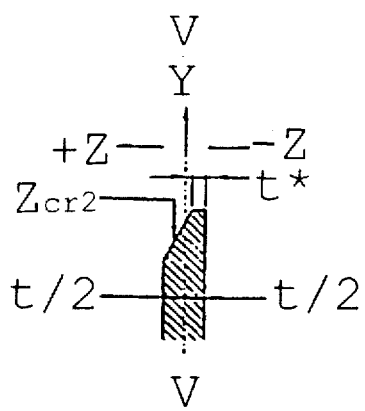
FIG. 5(b) is a schematic diagram showing the modified tip of a upshifting tooth.

With the same reason, if the position of chain pitch's side plate $P_{cr2}$ displacing in the axial direction as indicated in $Z_{cr2}$ of FIG. 5(b) while the chain pitch $C_a$ is in contact with point $P_{tip}$, when the tooth top has a thickness of t*, if $t/2+Z_{cr2} \geq t^*$, the chain pitch will bias out of L sprocket and achieve the purpose of upshifting. This point (tooth) is then referred as the upshifting point.

Figure 6:
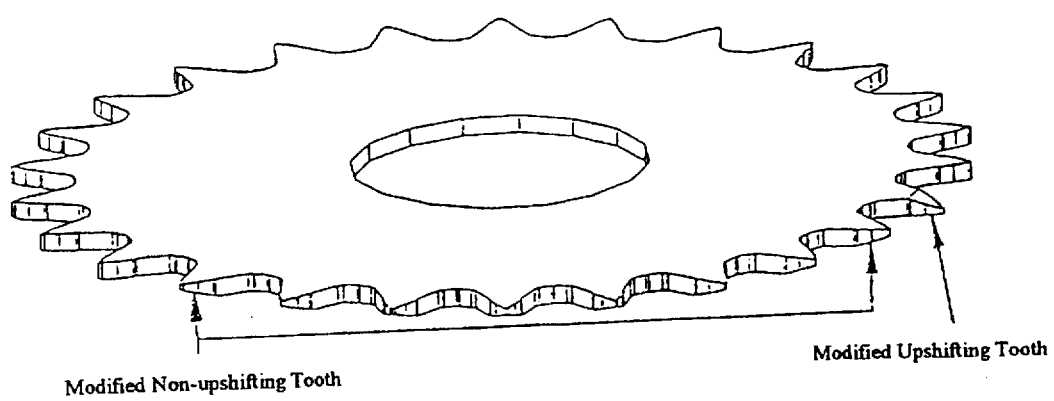
FIG. 6 is a geometrical view of the profile and arrangement of both modified upshifting and non-upshifting teeth.

After modification, the geometrical view of tooth tips at both the upshifting point and the non-upshifting point are indicated in FIG. 6.

Figure 7:
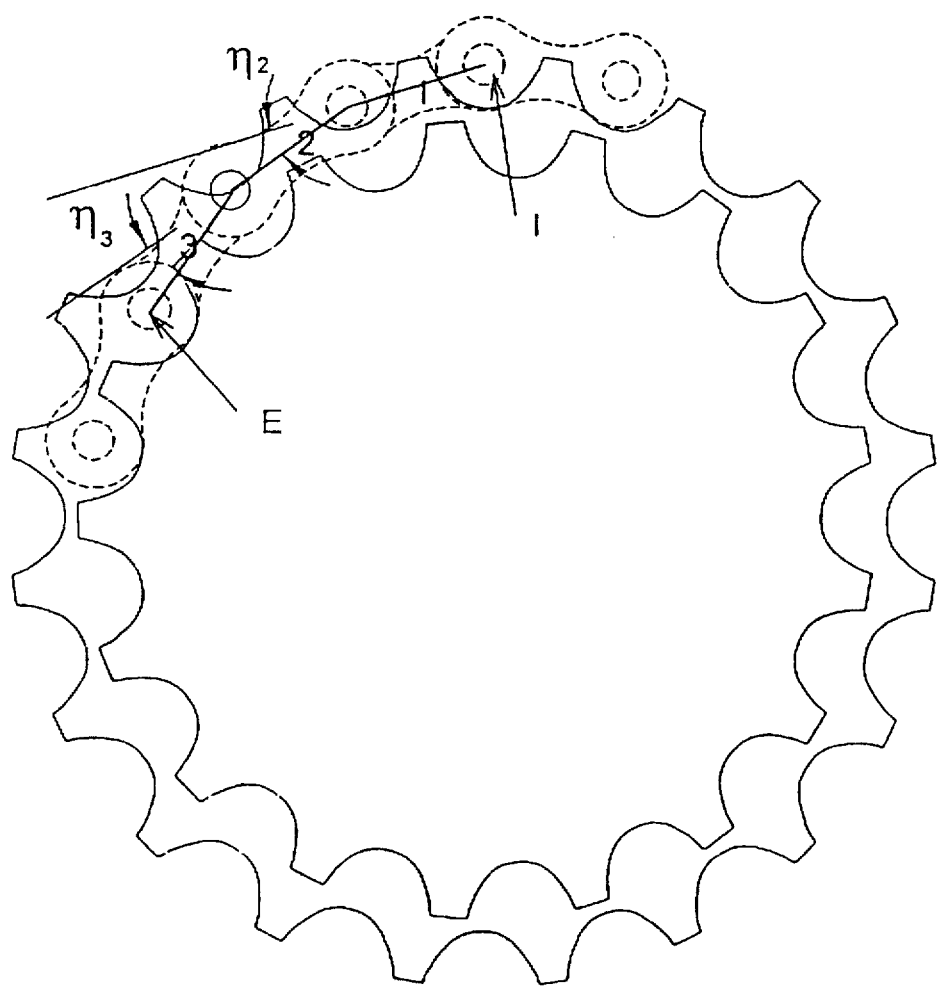
FIG. 7 is a scematic diagram showing a non-linear shifting path.

To prevent the said length of chain in the upshifting path from falling into the slots of S sprocket in a sudden manner, consequently causing impact to the same, this invention determines the upshifting path by a non-linear upshifting manner as shown in FIG. 7.

The gap existing between the inner and outer chain pitches shall enable the chain to bias under the pulling of guide pulley. With this feature and aid of a computer, a number of chain pitches in the entire shifting path shall be determined through calculation and, base on which the shifting path from L sprocket to S sprocket shall be determined accordingly as indicated in FIGS. 8(a), 8(b), and 8(c).

It becomes more apparent to recognize the bias situation of the chain at both the upshifting and the non-upshifting teeth by combining the upshifting path and modification of the tooth tip. As indicated in FIG. 8(a), the chain is being pulled in the direction towards S sprocket by guide pulley and biased out laterally from L sprocket, then, follows a given path and arrives at the location on S sprocket. FIG. 8(b) shows the chain unable to bias out of L sprocket at the non-upshifting tooth while being pulled towards S sprocket by guide pulley. FIG. 8(c) shows the position of the chain on L sprocket when it is not yet pulled out from L sprocket by guide pulley. The direction of the rotation for sprocket assembly and the direction of chain being pulled by guide pulley are all marked in the figures.

Figure 8A:
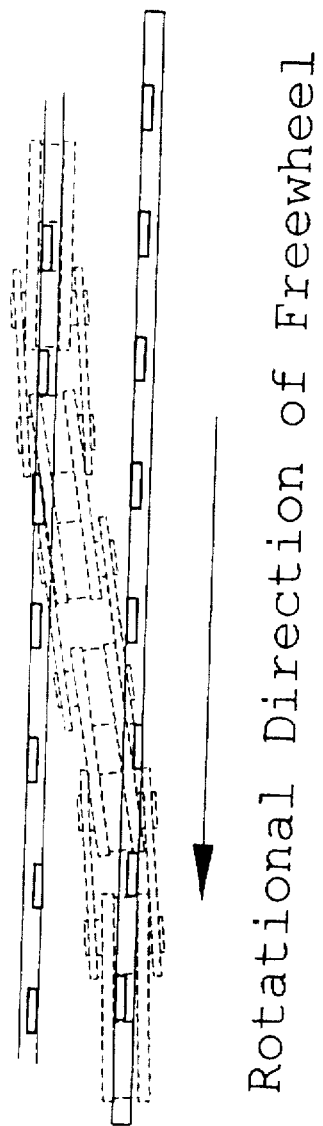
FIG. 8(a) is a schematic diagram showing the location of a chain pitch having biased laterally when the upshifting motion is taking place in relation to its adjacent chain pitches.
Figure 8B:
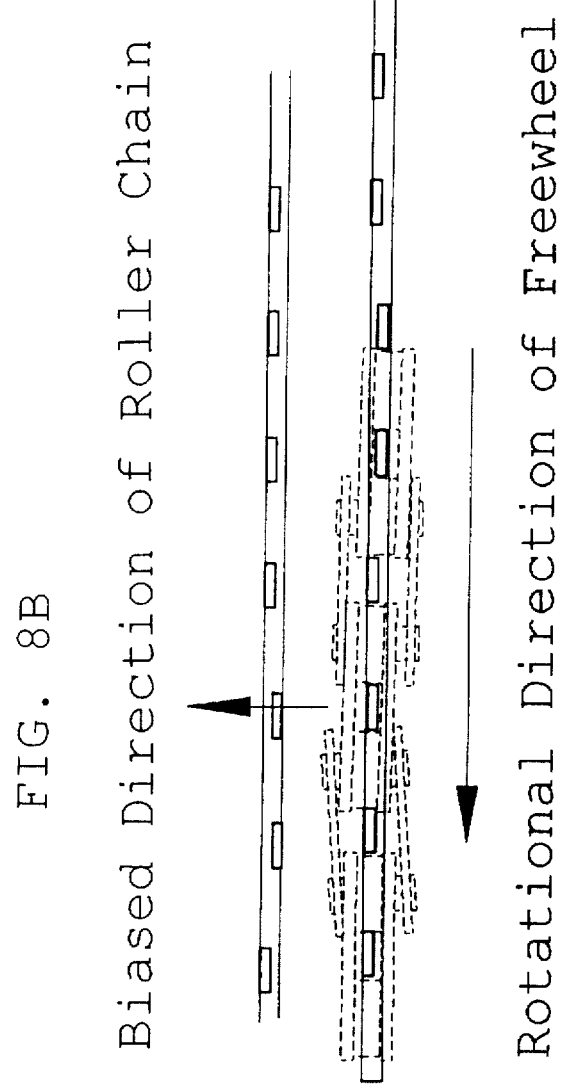
FIG. 8(b) is a schematic diagram showing the location of a chain pitch having biased laterally at the point of non-upshifting teeth in relation to its adjacent chain pitches.
Figure 8C:
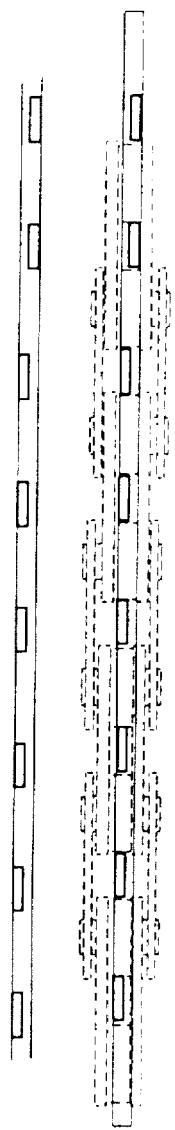
FIG. 8(c) is a schematic diagram showing the location of a chain pitch ready to bias before the upshifting motion is taking place in relation to its adjacent chain pitches.

The number of chain pitches in the entire upshifting path to be determined and corresponding locations for the chain pitches to bias in the upshifting path from L sprocket to S sprocket are indicated in FIG. 8(a).

According to the bias situation of chain pitches in the upshifting path as shown in FIG. 7, the first chain pitch in upshifting path is the one just disengaged with L sprocket, the roller (I) of which at far end is located inside of slot of L sprocket. The last chain pitch in the upshifting path is the one arrived at S sprocket, the roller (E) at its end is located inside of a slot in S sprocket. The relationship between both above mentioned chain pitches laid on both chain pitches respectively have a given related angle of refraction ($n_i$) which is a turning angel of (i) chain pitch in relation to (i-1) chain pitch. The length of distance between the center of the roller of upshifting chain pitch and the center of sprocket assembly should be somewhere between the length of radius of L sprocket and S sprocket, and $n_i \geq 0$.

Figure 9:
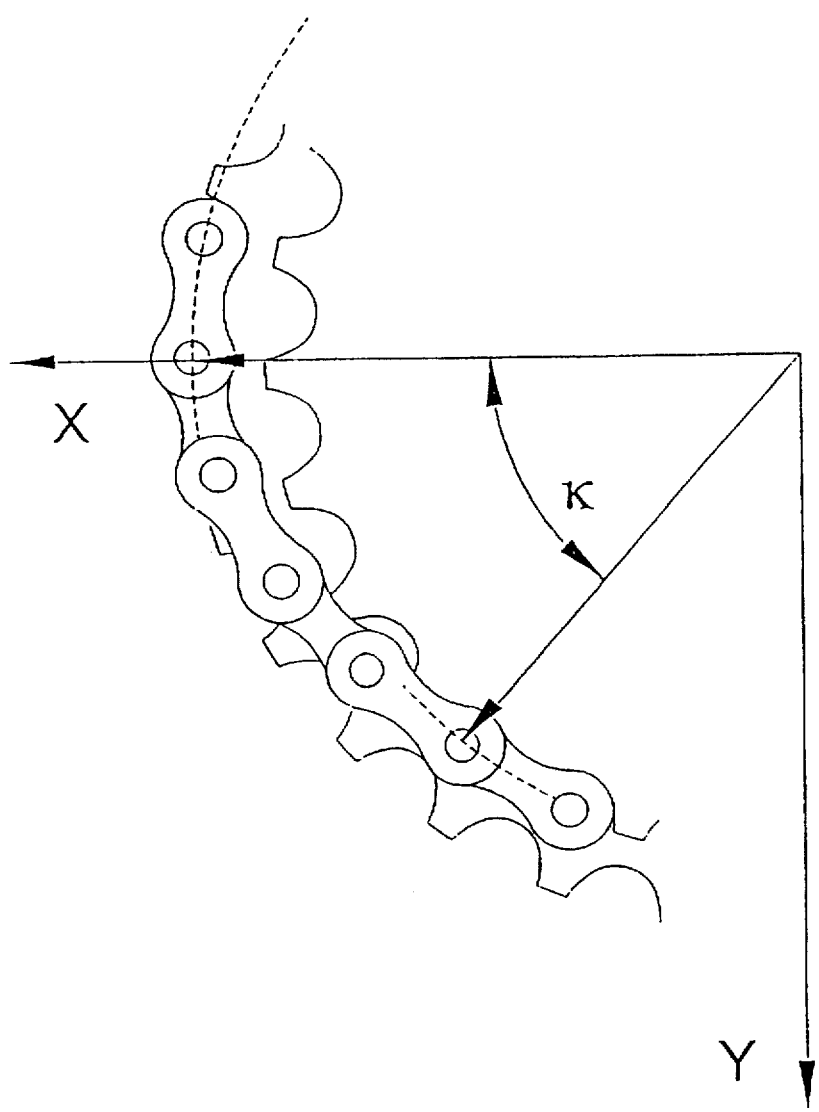
FIG. 9 is a schematic diagram showing the determined phase angle between L and S sprockets.

After determination of upshifting path, the location of chain pitch in the path can be calculated and the difference of phase angle between L sprocket and S sprocket can be determined from the location where the roller of the first chain pitch to be disengaged with L sprocket inside of a slot of L sprocket to the location where the roller of t he last chain pitch arrived at S sprocket, as indicated in FIG. 9.

The final step is to proceed the modification on lateral portion of teeth of both L and S sprockets. The purposes of this modification are for carrying the chain pitches in an upshifting path and for removing the interference portion in the upshifting path between the chain pitch and sprockets (as shown in FIG. 10).

Figure 10:
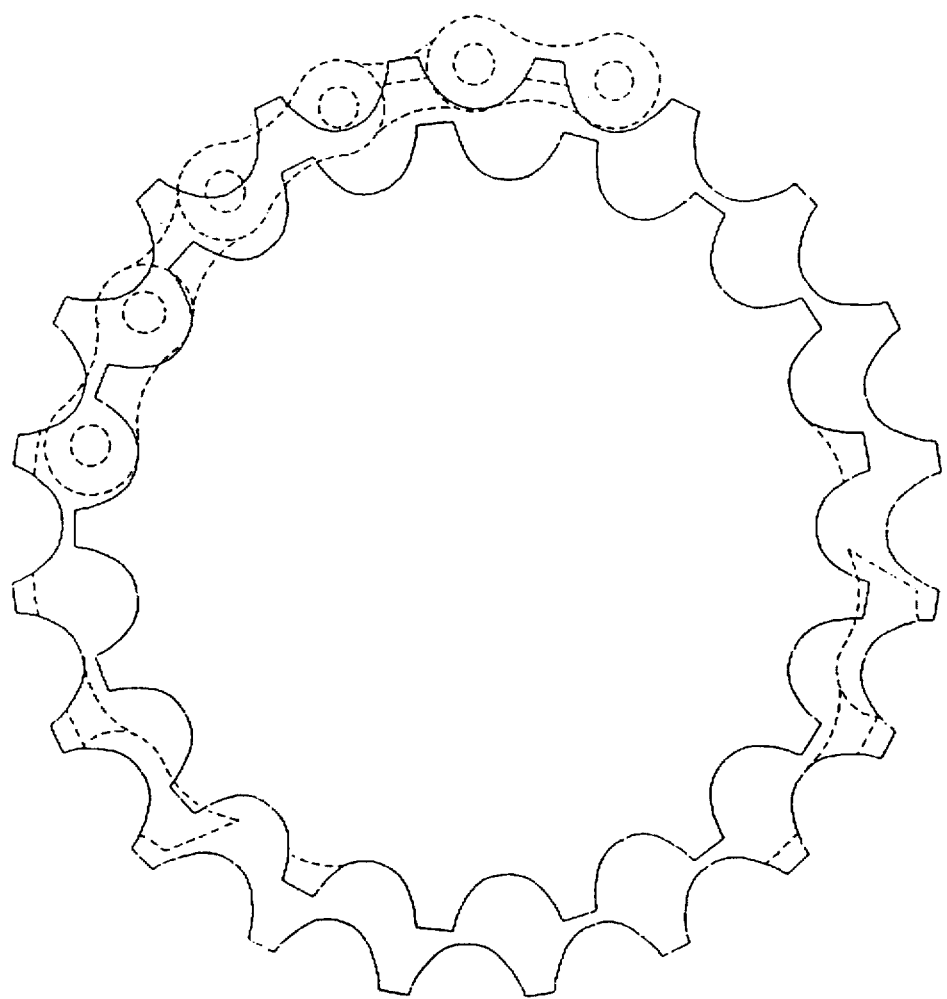
FIG. 10 is a schematic diagram showing the profile of upshifting teeth on L sprocket after completing the modification.
Figure 11:
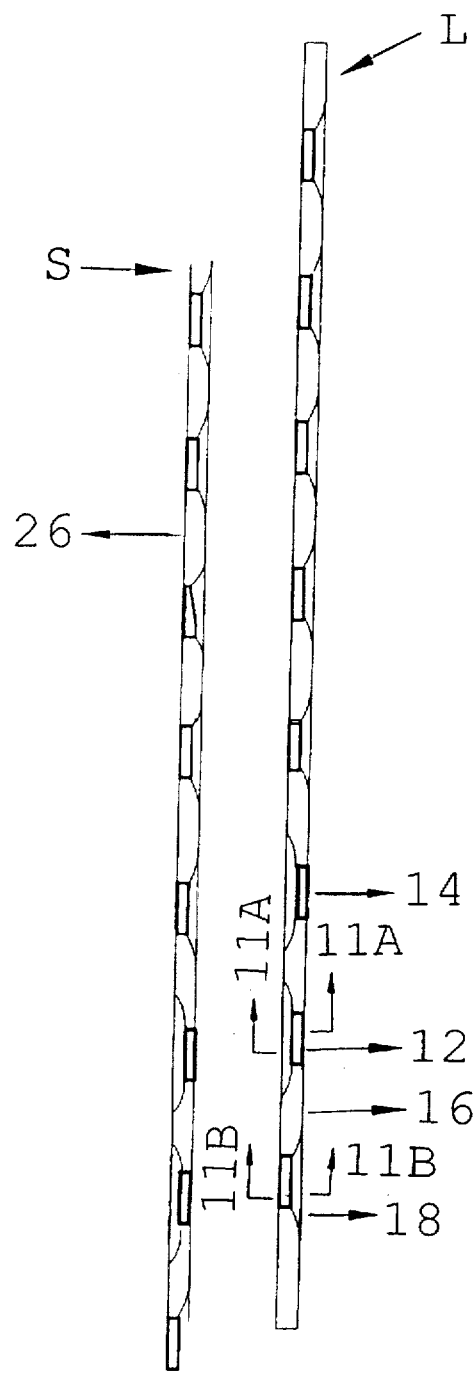
FIG. 11 is a side view of FIG. 10 and shows the location of cross-section views of critical teeth.
Figure 11A:
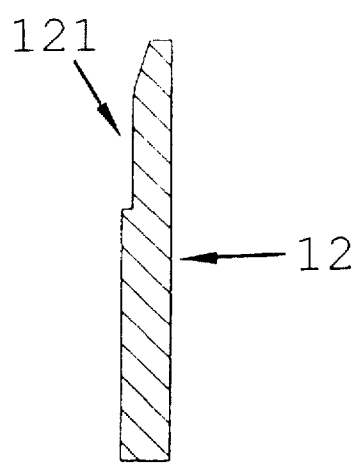
FIG. 11(a) is a view of cross-section XI(a)-XI(a).
Figure 11B:
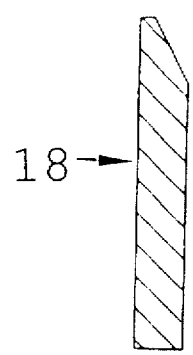
FIG. 11(b) is a view of cross-section XI(b)-XI(b).

FIG. 11 is a side view of FIG. 10 after the interference portion has been removed and FIGS. 11(a) and 11 (b) show the cross-section views of those critical teeth. The large sprocket L has a first upshifting tooth 12 and a second upshifting tooth 14. The upshifting teeth each have a recess portion 121 as shown in FIG. 11 (a). There exists an escape point (first center point) 16 between the first upshifting tooth 12 and the adjoining non-upshifting tooth 18. The smaller sprocket S has an engagement point (second center point) 26 for the chain to engage after upshifting from the larger sprocket L.

Through the above process and carrying out the removal of interference portion of sprocket assembly by using CATIA software, the manufacture of the same shall be computerized.

As described above, the present invention is featured in:

(1) modification is made on designated upshifting point and non-upshifting point on the L sprocket including the profile of teeth at both said points, in order to accurately control the location on sprocket where upshifting motion is to take place, and based on that to design and position those critical teeth.

(2) to determine the upshifting path by non-linear manner and to pre-determine the relative location for each chain pitch in the upshifting path, thus, the upshifting motion is quite improved and those unexpected unsmooth phenomenon due to the sudden release of the chain and resulting impact to S sprocket can be avoided.

As mentioned in the above prior art, the unsmooth phenomenon caused by the chain traveling from L sprocket to S sprocket will be directly responded by the cage of derailleur to rotate reversibly. This is to say that the said length of chain pitches shall fall into the slots of S sprocket in a sudden moment and cause an impact to S sprocket. At this instance, the turning angle of said cage $\theta^*$, the angular speed of said cage $d\theta^*/d\xi$, the angular acceleration of said cage $d^2\theta^* / d\xi^2$ tend to change suddenly.

Figure 12A:
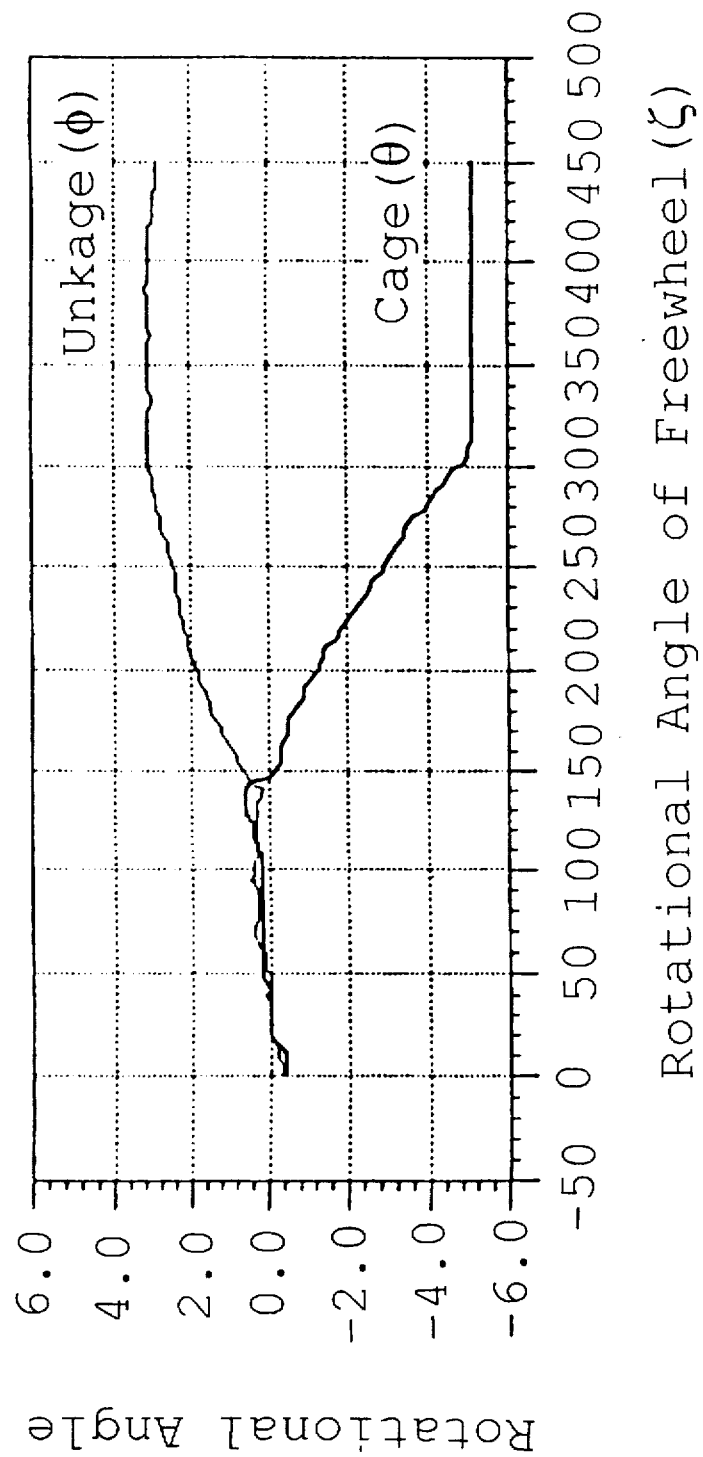
FIG. 12(a) is a graph showing rotational angle versus rotational angle of freewheel.
Figure 12B:
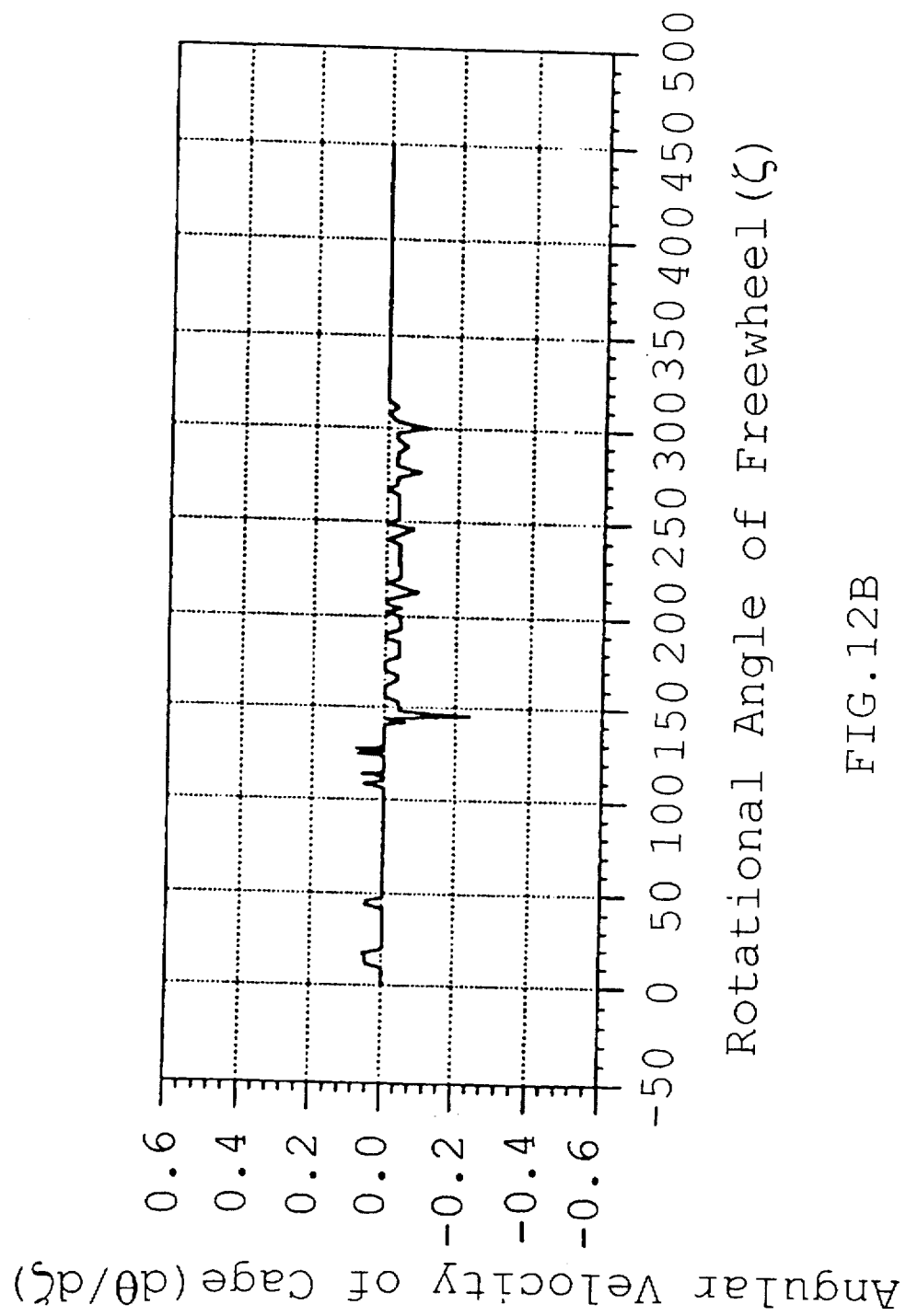
FIG. 12(b) is a graph showing angular velocity of cage versus rotational angle of freewheel.
Figure 12C:
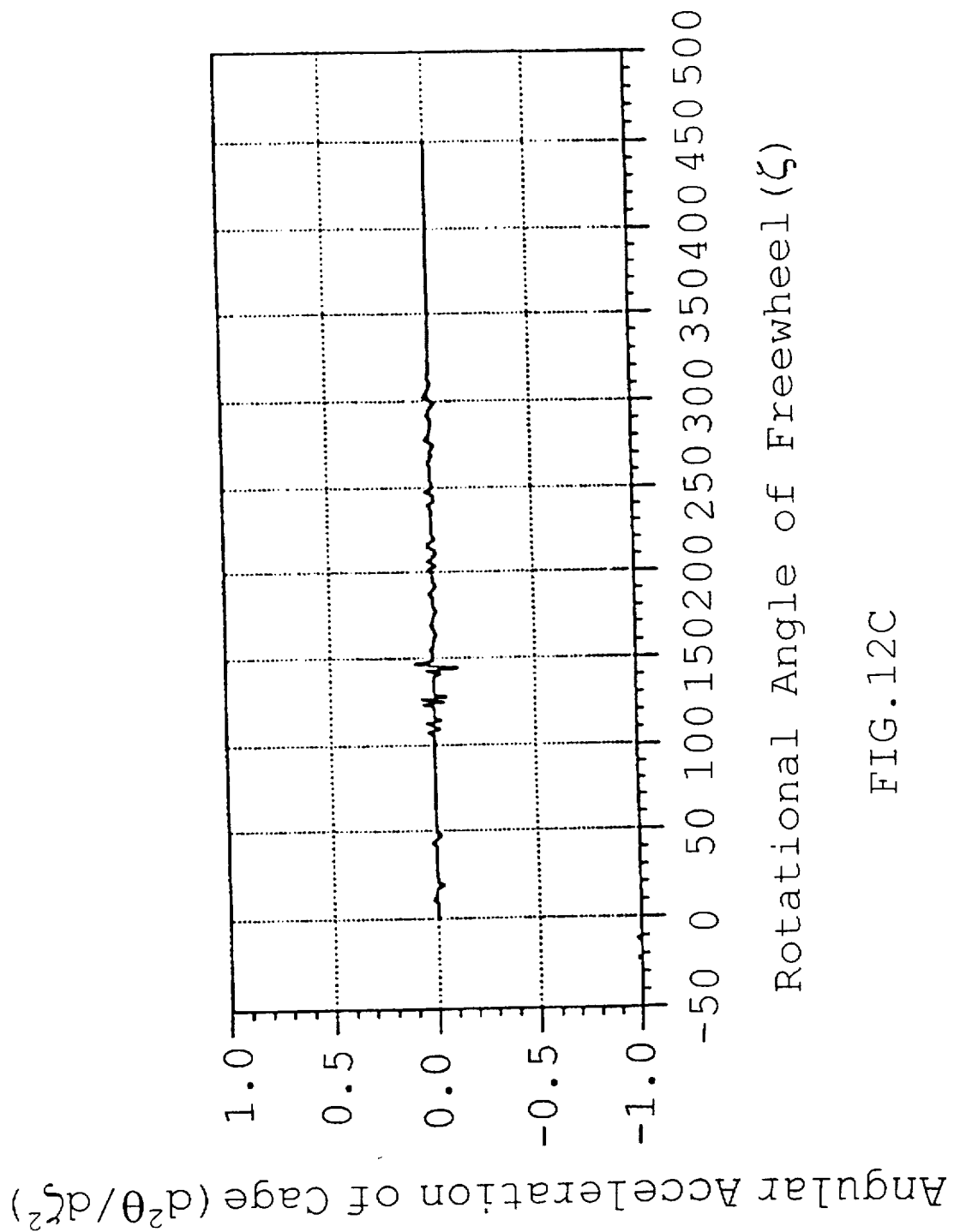
FIG. 12(c) is a graph showing angular acceleration of cage versus rotational angle of freewheel.

Inventor conducted several experiments with CATIA software to produce CNC code, then processing by a milling machine was done with an encoder to measure the amount of above said angular change of $\theta^*$ as well as its change of relation with the turning angle of sprocket assembly. Compensating measure was made to turning angle $\theta^*$ in order to obtain the following relationship as indicated in FIGS. 12(a)–12(c).

As a result, it becomes apparent that the curve has been flattened, which solves the problem of unsmoothness.

Although the present invention has been described above, they are merely exemplar of the invention and not to be construed as limiting. The invention is defined solely by the appended claims.

What is claimed is:

1. A multistage sprocket assembly used in a bicycle rear derailleur system for moving a chain with a plurality of chain pitches each having a roller of the bicycle from one sprocket to another sprocket, said multistage sprocket assembly comprises:

at least one larger diameter sprocket, at least one smaller diameter sprocket, said larger diameter sprocket having modified teeth tips, said modified teeth tips providing accurate upshifting, said modified teeth tips allowing for non-interfered movement of the chain between the larger diameter sprocket and the smaller diameter sprocket, and a guide pulley;

a proper changer's path for the chain to be engaged with a tooth of either the larger diameter sprocket or smaller diameter sprocket, an upshifting path formed by a relative location of each chain pitch in the upshifting process whereby a gap is defined between an inner chain pitch and an outer chain pitch so as to permit the upshifting to bias under the pulling action by the guide pulley; and whereby the distance between the center of a roller of a chain pitch not on said larger diameter sprocket and said smaller diameter sprocket is in a range between a radius of the larger diameter sprocket and a radius of the smaller diameter sprocket.

2. A multistage sprocket assembly used in a bicycle rear derailleur system for moving a chain with a plurality of chain pitches each having a roller of the bicycle from one sprocket to another sprocket, said multistage sprocket assembly comprising:

at least one larger diameter sprocket, at least one smaller diameter sprocket adjacent to said at least one larger diameter sprocket, at least one upshifting tooth on the larger diameter sprocket, said at least one upshifting tooth having a first face facing towards said smaller diameter sprocket and a second face facing away from said smaller diameter sprocket, said at least one upshifting tooth providing accurate upshifting of the chain from the larger diameter sprocket to the smaller diameter sprocket, an upshifting point at said at least one upshifting tooth, and at least one non-upshifting tooth on the larger diameter sprocket, each of said at least one non-upshifting tooth having a tooth tip, a non-upshifting point at said at least one non-upshifting tooth; and a proper changer's path for the chain to be engaged with a tooth of either the larger diameter sprocket or the smaller diameter sprocket, a phase angle between the larger diameter sprocket and the smaller diameter sprocket, wherein said tooth tip at said non-upshifting point engages one of the plurality of chain pitches so as to prevent the chain pitch from moving off said tooth tip, so as to delay upshifting until the chain pitch reaches said upshifting point; and whereby at said upshifting point the chain pitch is able to move off said upshifting tooth in order to begin upshifting, and the distance between the center of a roller of a chain pitch not on said larger diameter sprocket and said smaller diameter sprocket is in a range between a radius of the larger diameter sprocket and a radius of the smaller diameter sprocket.

3. The multistage sprocket assembly used in a bicycle rear derailleur system as defined in claim 2, wherein the phase angle between the larger diameter sprocket and the smaller diameter sprocket is determined from a location of a first disengaging chain pitch inside of a slot on the larger diameter sprocket to a location of a last chain pitch to arrive at the smaller diameter sprocket.

4. The multistage sprocket assembly used in a bicycle rear derailleur system as defined in claim 2, wherein a lateral portion of the teeth of both the larger diameter sprocket and the smaller diameter sprocket have been modified according to the location of inner and outer chain pitches in the upshifting path for the purpose of removing the interference portion between the chain and both the larger diameter sprocket and the smaller diameter sprocket.

5. The multistage sprocket assembly used in a bicycle rear derailleur system as defined in claim 4, wherein the modification made on the lateral portion of teeth of both the larger diameter sprocket and the smaller diameter sprocket enables the chain to move from the larger diameter sprocket to the smaller diameter sprocket through a designated path so as to avoid unsmooth phenomenon caused by shifting.

6. A multistage sprocket assembly for a bicycle comprising:

a plurality of different radius sprockets, with at least one larger sprocket and at least one smaller sprocket, each sprocket having a plurality of teeth on an outer periphery, each sprocket being disposed adjacent each other to engage with a drive chain guided by a derailleur, a first center point between a pair of adjacent teeth of said at least one larger sprocket, a second center point between a pair of adjacent teeth of said at least one smaller sprocket, said first center point and said second center point being set as the escape point and the engagement point, respectively, when the drive chain shifts from a first sprocket to a second sprocket smaller than the first sprocket, the length of distance between each center of a roller of the drive chain between said escape point and said engagement point to a center of said multistage sprocket assembly is in a range between a radius of said first sprocket and a radius of said second sprocket;

said larger sprocket having a recess portion on a side surface facing said smaller sprocket and at a position of said larger sprocket corresponding to an upshifting path of the drive when shifting between said escape point and engagement point.

7. A multistage sprocket assembly according to claim 6, wherein said plurality of teeth of said first sprocket include upshifting and non-upshifting teeth for controlling the disengagement position of said first sprocket when the drive chain is shifted from said first sprocket to said smaller sprocket.

8. A multistage sprocket assembly according to claim 7, wherein at least two teeth among the plurality of teeth of said first sprocket are upshifting teeth with a first upshifting tooth positioned behind said escape point and a second upshifting tooth adjacent thereto and positioned rearward in the rotation direction of said first sprocket, an apex of said upshifting teeth are chamfered at the side surface facing said second sprocket such that a roller of the drive chain to be first disengaged from said first sprocket is pushed toward said second sprocket when the drive chain is shifted from said first sprocket to said second sprocket.

9. A multistage sprocket assembly according to claim 7, wherein an apex of said non-upshifting teeth is chamfered at the side surface facing away from said smaller sprocket such that said larger sprocket retains a roller of the drive chain when the drive chain is shifted from said larger sprocket to said smaller sprocket.

10. A multistage sprocket assembly according to claim 6, wherein said recess portion on said larger sprocket is cut at said side surface of said larger sprocket facing said smaller sprocket, said recess portion having a shape for preventing interference of a side link plate of the drive chain from said side surface of said larger sprocket when the drive chain is shifted from said larger sprocket to said smaller sprocket, and said recess portion having a sufficient depth to support the drive chain between said escape point and said engagement point.

11. A multistage sprocket assembly according to claim 10, wherein the drive chain betweeen said escape point and said engagement point is supported by said recess portion and forms a nonlinear upshifting path as seen in an axial direction from said smaller sprocket to said larger sprocket.

* * * * *